US012777479B2

(12) United States Patent
Kumar et al.

(10) Patent No.: US 12,777,479 B2
(45) Date of Patent: Oct. 27, 2026

(54) METHOD AND SYSTEM FOR SCHEDULING TRANSMISSION IN MULTI-SIM USER EQUIPMENT (UE)

(71) Applicant: Samsung Electronics Co., Ltd., Suwon-si (KR)

(72) Inventors: Rohit Kumar, Bangalore (IN); Pavan Kumar Devarayanigari, Bangalore (IN); Sree Ratan Tej Maddukuri, Bangalore (IN); Bharath Kumar, Bangalore (IN)

(73) Assignee: Samsung Electronics Co., LTD., Gyeonggi-do (KR)

( * ) Notice: Subject to any disclaimer, the term of this patent is extended or adjusted under 35 U.S.C. 154(b) by 0 days.

(21) Appl. No.: 18/610,788

(22) Filed: Mar. 20, 2024

(65) Prior Publication Data

US 2024/0323955 A1 Sep. 26, 2024

(30) Foreign Application Priority Data

Mar. 24, 2023 (IN) ............................ 202341021241

(51) Int. Cl.
*H04W 72/1268* (2023.01)
*H04L 1/1867* (2023.01)
*H04W 88/06* (2009.01)

(52) U.S. Cl.
CPC ....... *H04W 72/1268* (2013.01); *H04L 1/1887* (2013.01); *H04W 88/06* (2013.01)

(58) Field of Classification Search
CPC ............. H04W 72/1268; H04W 88/06; H04W 72/115; H04W 72/1221; H04W 72/1273;
(Continued)

(56) References Cited

U.S. PATENT DOCUMENTS 9,282,567 B2 3/2016 Golitschek Edler von Elbwart et al.
9,450,638 B2 9/2016 Yan et al.
(Continued)

FOREIGN PATENT DOCUMENTS

WO 2009-126902 A2 10/2009
WO 2017-136458 A2 8/2017
WO 2022070169 A1 4/2022

OTHER PUBLICATIONS

Extended European Search Report, dated Jun. 5, 2024, issued in European Patent Application No. 24161961.8.
(Continued)

*Primary Examiner* — Thai Q Tran

(74) *Attorney, Agent, or Firm* — Harness, Dickey & Pierce, P.L.C.

(57) ABSTRACT

Provided is a method and system of scheduling transmission of signals in a multi-SIM UE. The method includes performing an active communication session through a $T_x$ channel of the multi-SIM UE, the $T_x$ channel being associated with a corresponding first set of $R_x$ channels, the first set of Rx channels including at least one among a plurality of Rx channels of the multi-SIM UE, receiving one or more DL signals in a second set of $R_x$ channels among the plurality of $R_x$ channels while the $T_x$ channel is not allocated to transmit one or more uplink (UL) signals corresponding to the one or more DL signals, generating a UL-TB using a RLC SDU in response to the receiving, the RLC SDU corresponding to one or more pending UL grants of the one or more UL signals, and transmitting the UL-TB to a network entity via a PUSCH.

20 Claims, 8 Drawing Sheets

(58) Field of Classification Search
CPC .... H04W 72/21; H04L 1/1887; H04L 1/1864; H04L 1/1893; H04L 1/1874; H04L 1/1812
USPC .......................................................... 370/329
See application file for complete search history.

(56) References Cited

U.S. PATENT DOCUMENTS

| | | | | |
|---|---|---|---|---|
| 10,027,359 | B2 | 7/2018 | Krishnamoorthi et al. | |
| 10,616,381 | B2 | 4/2020 | Moon et al. | |
| 10,645,610 | B2 | 5/2020 | Kunt et al. | |
| 2012/0071185 | A1 | 3/2012 | Dayal et al. | |
| 2013/0215862 | A1* | 8/2013 | Suzuki | H04W 72/23 370/329 |
| 2015/0023230 | A1 | 1/2015 | Hu et al. | |
| 2015/0229449 | A1 | 8/2015 | Chun et al. | |
| 2017/0208443 | A1 | 7/2017 | Gupta et al. | |
| 2018/0310339 | A1* | 10/2018 | Li | H04W 74/0808 |
| 2021/0029773 | A1* | 1/2021 | Majumder | H04W 8/183 |
| 2021/0076440 | A1* | 3/2021 | Qiu | H04W 88/06 |
| 2022/0345252 | A1* | 10/2022 | Loehr | H04L 1/1874 |

OTHER PUBLICATIONS

Office action for Indian Patent Application No. 202341021241, dated Apr. 8, 2026.

* cited by examiner

METHOD AND SYSTEM FOR SCHEDULING TRANSMISSION IN MULTI-SIM USER EQUIPMENT (UE)

CROSS-REFERENCE TO RELATED APPLICATION

This application is based on and claims priority under 35 U.S.C. § 119 to Indian Provisional Patent Application No. 202341021241, filed on Mar. 24, 2023, and Indian Patent Application No. 202341021241, filed on Feb. 6, 2024, in the Indian Intellectual Property Office, the disclosure of which is hereby incorporated by reference herein in its entirety.

TECHNICAL FIELD

The present disclosure generally relates to the field of wireless communication and more particularly relates to a method and system for scheduling transmission in a multi-subscriber identity module (multi-SIM) user equipment (UE).

BACKGROUND

In recent days, most UEs or mobile devices include multi-SIMs or multi stacks. The multi-SIM UEs, to allow a user to make a call, surf the internet, or send short message service (SMS) from any one SIM among the multi-SIMs. Further, the multi-SIM UEs provide the option of using any SIM of the multi-SIMs to communicate without compromising communication quality.

Each multi-SIM UE uses a plurality of receiving (Rx) channels and a plurality of transmission (Tx) channels for receiving downlink (DL) signals and transmitting uplink (UL) signals, respectively, to establish communication between the UE and a network entity. Each of the multi-SIM UE's SIMs has a corresponding Rx channel for receiving DL signals from the network entity. In conventional methods, the number of Tx channels is always less than the number of Rx channels in order to reduce UE manufacturing costs. As a result, all Rx channels are not allotted to corresponding Tx channels for initiating communication with the network entity. Hence, a set of Rx channels, to which the Tx channels are allocated, only communicate with the network entity via the corresponding Tx channels. As a result, in the absence of allocation of Tx channels to the remaining Rx channels, the UL signals in response to the DL signals for the remaining Rx channels for which no Tx channels are allocated are wasted. Thus, the network entity's resource allocation to the UE for the remaining Rx channels is wasted. Also, in the absence of any acknowledgment (ack) or responses from the UE, the network entity penalizes the UE by not allocating future resources.

In addition, the UE periodically sends important information via the UL signals for synchronization between the network entity and the UE. For example, the UE may transmit channel quality information (CQI), a rank indicator (RI), and sounding reference signals (SRS) periodically in the UL signals via Tx channels to inform the network entity of the channel information. Therefore, in the absence of Tx channels corresponding to the remaining Rx channels, the important UL information is not shared with the network entity from the UE. Further, the synchronization between the UE and the network entity is hindered due to the non-allocation of Tx channels to the remaining Rx channels.

Therefore, the conventional methods for scheduling transmission in a multi-SIM UE result in resource wastage in the absence of Tx channel allocation corresponding to all Rx channels. Further, the conventional methods also fail to provide a solution regarding usages of the Tx channels allocation for transmission of the UL signals to the network entity. Additionally, none of the conventional methods for scheduling transmission in the multi-SIM UE describes how to handle the transmission of important UL information in the absence of the Tx channel allocation.

An example of scheduling a transmission in a multi-SIM UE is shown in FIG. 1 of the drawings, in accordance with existing art. FIG. 1 illustrates the scheduling of transmission of UL signals in a dual SIM UE, which has dual Rx channels and a single Tx channel. The dual SIM UE includes a first SIM (SIM1) and a second SIM (SIM2) for establishing a connection with the network entity. The single Tx channel is shared between dual Rx channels of SIM1 and SIM2 in a round-robin schedule. From timestamp T=0 to T=20, the Tx channel is allocated to SIM1. Further, from timestamp T=21 to T=40, the Tx channel is allocated to SIM2. The transmission associated with SIM1 is handled during the timestamp from T=0 to T=20, as the Tx channel is allocated to SIM1 and all transmission signals including network packets are transmitted from SIM1 to the network entity via the allocated Tx channel. However, during the timestamp from T=0 to T=20, all transmissions from SIM2 to the network entity are skipped. More particularly, a transmission of a hybrid automatic repeat request (HARQ) transmission signal and a radio link control (RLC) service data unit (SDU) packet for SIM2 are skipped. Therefore, the HARQ transmission signal and the RLC SDU packet are lost for SIM2 corresponding to the DL signals received by Rx of SIM2 during the timestamp from T=0 to T=20. Similarly, during the timestamp between T=21 to T=40, the SIM2 transmission is handled, as the Tx channel is allocated to the Rx channel corresponding to SIM2. As a result, the HARQ transmission signal and RLC SDU packet are skipped for SIM1 during timestamp from T=21 to T=40.

SUMMARY

This summary is provided to introduce a selection of concepts, in a simplified format, that are further described in the detailed description of the disclosure. This summary is neither intended to identify key or essential inventive concepts of the disclosure nor is it intended for determining the scope of the disclosure.

According to embodiments, a method and system that overcomes each of the challenges discussed herein are provided. Disclosed herein is a method of scheduling transmission of a plurality of signals in a multi-subscriber identity module (SIM) user equipment (UE). The method includes performing an active communication session through at least one transmission ($T_x$) channel of the multi-SIM UE, the at least one $T_x$ channel being associated with a corresponding first set of Rx channels, the first set of Rx channels including at least one among a plurality of Rx channels of the multi-SIM UE, receiving one or more downlink (DL) signals in a second set of Rx channels among the plurality of Rx channels while the at least one $T_x$ channel is not allocated to transmit one or more uplink (UL) signals corresponding to the one or more DL signals, generating a UL Transport Block (UL-TB) using a Radio Link Control (RLC) Service Data Unit (SDU) in response to the receiving, the RLC SDU corresponding to one or more pending UL grants of the one or more UL signals, and transmitting the UL-TB to a network entity via a Physical Uplink Shared Channel (PUSCH).

Also, disclosed herein is a system for scheduling transmission of a plurality of signals in a multi-subscriber identity module (SIM) user equipment (UE). The system includes a plurality of receivers configured to receive a plurality of downlink (DL) signals via a plurality of receiving (Rx) channels, at least one transmitter configured to transmit at least one uplink (UL) signals via at least one transmission (Tx) channel, and processing circuitry configured to perform an active communication session through the at least one $T_x$ channel with a corresponding first set of Rx channels, the first set of Rx channels including at least one among the plurality of Rx channels, receive one or more DL signals in a second set of Rx channels among the plurality of $R_x$ channels while the at least one $T_x$ channel is not allocated for transmitting one or more UL signals corresponding to the one or more DL signals, generate a UL transport block (UL-TB) using a radio link control (RLC) service data unit (SDU) in response to the reception of the one or more DL signals, the RLC SDU corresponding to one or more pending UL grants of the one or more UL signals, and transmit the UL-TB to a network entity via a physical uplink shared channel (PUSCH).

To further clarify the advantages and features of the disclosure, a more particular description of the disclosure will be rendered by reference to specific examples thereof, which are illustrated in the appended drawings. It is appreciated that these drawings depict only typical examples of the disclosure and are therefore not to be considered limiting its scope. The disclosure will be described and explained with additional specificity and detail with the accompanying drawings.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
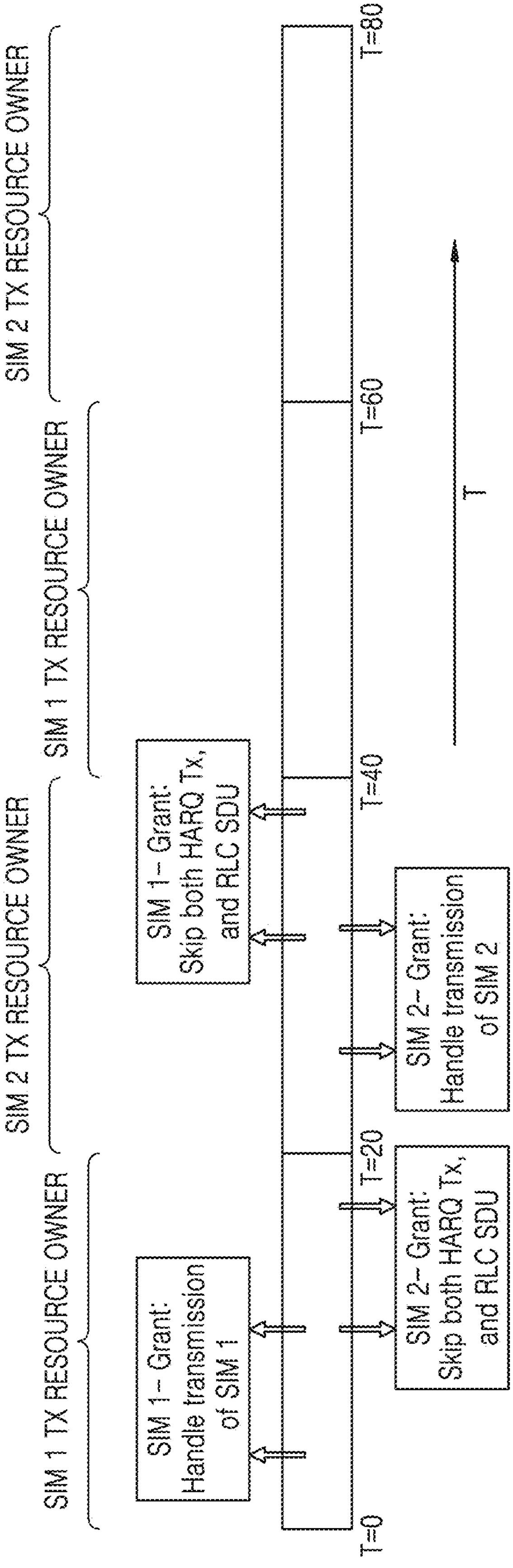
FIG. 1 illustrates an example of scheduling a transmission in a multi-SIM UE, in accordance with existing art.

Further, skilled artisans will appreciate those elements in the drawings are illustrated for simplicity and may not have necessarily been drawn to scale. For example, the flow charts illustrate the method in terms of the most prominent operations involved to help to improve understanding of aspects of the present disclosure. Furthermore, in terms of the construction of the device, one or more components of the device may have been represented in the drawings by conventional symbols, and the drawings may show only those specific details that are pertinent to understanding embodiments of the present disclosure so as not to obscure the drawings with details that will be readily apparent to those of ordinary skill in the art having the benefit of the description herein.

DETAILED DESCRIPTION

For the purpose of promoting an understanding of the principles of the disclosure, reference will now be made to embodiments and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

The term "some" or "one or more" as used herein is defined as "one", "more than one", or "all." Accordingly, the terms "more than one," "one or more" or "all" would all fall under the definition of "some" or "one or more". The term "an embodiment", "another embodiment", "some embodiments", "embodiments" or "in one or more embodiments" may refer to one embodiment or several embodiments, or all embodiments. Accordingly, the terms "some embodiments" and "embodiments" are defined as meaning "one embodiment, or more than one embodiment, or all embodiments".

The terminology and structure employed herein are for describing, teaching, and illuminating embodiments and their specific features and elements and do not limit, restrict, or reduce the spirit and scope of the claims or their equivalents. The phrase "exemplary" may refer to an example.

More specifically, any terms used herein such as but not limited to "includes," "comprises," "has," "include", "comprising", "have", and grammatical variants thereof do not exclude the possible addition of one or more features or elements, unless otherwise stated, and must not be taken to exclude the possible removal of one or more of the listed features and elements, unless otherwise stated, for example, with the limiting language "must comprise" or "needs to include".

Whether or not a certain feature or element was limited to being used only once, either way, it may still be referred to as "one or more features", "one or more elements", "at least one feature", or "at least one element". Furthermore, the use of the terms "one or more" or "at least one" feature or element does not preclude there being none of that feature or element unless otherwise specified by limiting language such as "there needs to be one or more" or "one or more element is required."

Unless otherwise defined, all terms, and especially any technical and/or scientific terms, used herein may be taken to have the same meaning as, or a similar meaning to, that commonly understood by one having ordinary skill in the art.

The terms "transmitter" and "transmission channels" may be used interchangeably throughout the disclosure.

The terms "receiver" and "receiving channels" may be used interchangeably throughout the disclosure. According to embodiments, the term "receiving channels" may be used herein to refer to SIMs respectively corresponding to the "receiving channels."

The terms "user equipment (UE)" and "device" may be used interchangeably throughout the disclosure.

The terms "SIM" and "stack" may be used interchangeably throughout the disclosure.

The terms "HARQ buffer" and "memory" may be used interchangeably throughout the disclosure.

The terms "timeframe" and "timestamp period" may be used interchangeably throughout the disclosure.

Embodiments of the present disclosure will be described below in detail with reference to the accompanying drawings.

Figure 2:
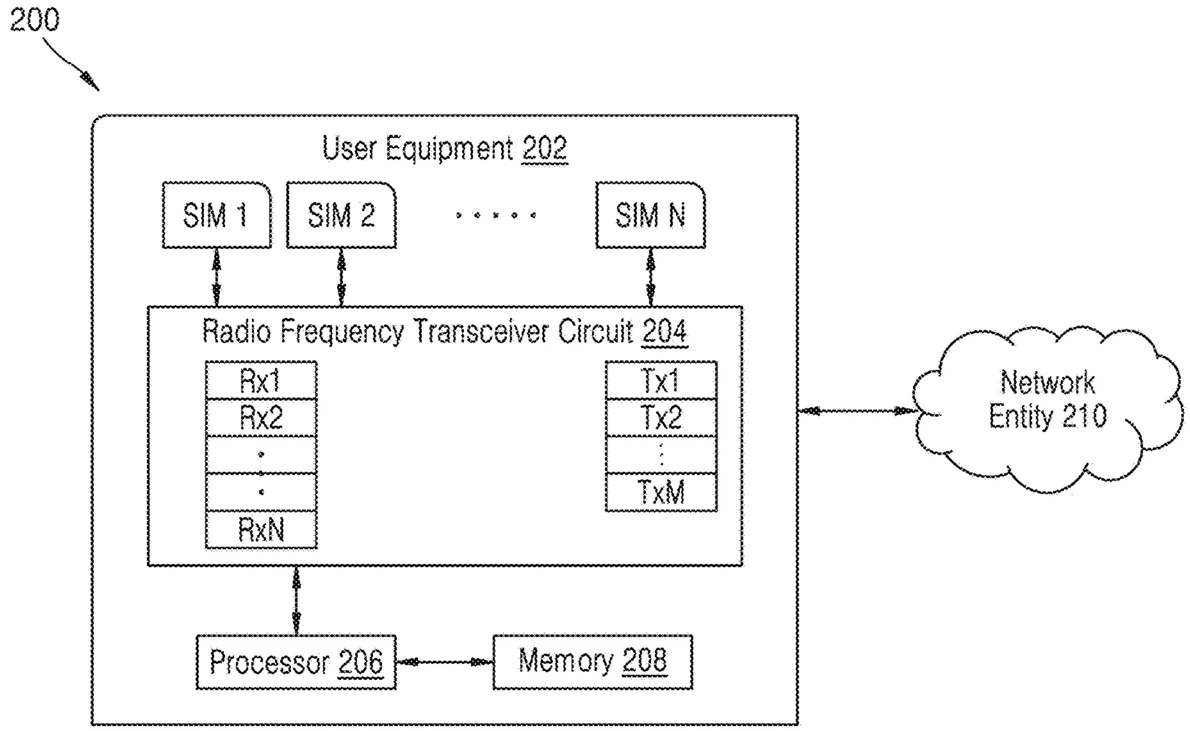
FIG. 2 illustrates a schematic block diagram of a system for scheduling transmission of a plurality of signals in a multi-subscriber identity module (SIM) user equipment (UE), in accordance with embodiments of the present disclosure.

FIG. 2 illustrates a schematic block diagram of a system 200 for scheduling transmission of a plurality of signals in a multi-subscriber identity module (SIM) user equipment (UE), in accordance with embodiments of the present disclosure. In embodiments, the system 200 includes a UE 202 configured with a plurality of subscriber identity modules (SIM1, SIM2, . . . , SIM N), a radio frequency transceiver circuit 204, a processor 206, and/or a memory 208. The radio frequency transceiver circuit 204 includes a plurality of transmitters (Rx1, Rx2, . . . , RxN) and a plurality of receivers (Tx1, Tx2, . . . , TxM). The UE 202 is configured to communicate with a network entity 210. In embodiments, the UE 202 may correspond but is not limited to, a smartphone, a mobile device, other mobile devices, a portable communication device, a laptop, a tablet, etc. having the plurality of SIMs for communicating with the network entity 210.

In embodiments, each of the SIMS (for example, SIM1, SIM2, . . . , SIM N) is an integrated circuit that securely stores an international mobile subscriber identity (IMSI) number and a key related to the corresponding SIMs. The IMSI number and a key related to the IMSI identify (e.g., uniquely identify) the user using the corresponding SIMs. Each of the SIMS, may also be known as a stack and may include a limited memory for storing contact details or messages. In embodiments, the SIM may relate to an embedded SIM or eSIM. The eSIM is a programmable SIM card embedded directly into the device. The eSIM is configured with advanced security protocols and is more secure than a normal SIM. Also, the eSIM may be configured not to be removed or unmounted from the device. The eSIM may be activated instantly (or promptly) by scanning a quick response (QR) code corresponding to the service operator. In embodiments, the UE 202 may include an N number of SIMs, such as SIM1, SIM2, . . . , SIM N, where N may be any positive integer greater than or equal to two. In a non-limiting example, a dual-SIM UE may include two SIMs for establishing communication with the network entity 210. Further, a triple-SIM UE includes three SIMs for establishing communication with the network entity 210.

In embodiments, the radio frequency transceiver circuit 204 is communicatively coupled with the plurality of SIMs for transmitting and receiving a plurality of communication signals. The radio frequency transceiver circuit 204 may include an N number of receivers (Rx1, Rx2, . . . , RxN) and an M number of transmitters (Tx1, Tx2, . . . , TxM), where N may be any positive integer number greater than or equal to two, and M may be any positive integer number greater than or equal to one. In addition, the value of N may be greater than (e.g., always greater than) the value of M. Each of the plurality of SIMs has a corresponding Rx. However, each of the plurality of Rx does not have a corresponding Tx for facilitating active communication parallelly, since the number of receivers in a UE is greater than the number of transmitters in order to reduce the manufacturing cost of the UE 202. Each of the plurality of receivers corresponds to a receiving channel for receiving downlink (DL) signals from the network entity 210 to the UE 202. Each of the plurality of transmitters corresponds to a transmission channel for transmitting uplink (UL) signals from the UE 202 to the network entity 210.

In embodiments, the processor 206 may be operatively coupled to the radio frequency transceiver circuit 204 for processing, executing, or performing a plurality of operations. Further, the processor 206 is communicatively coupled to the memory 208. In embodiments, the processor 206 may include at least one data processor for executing processes in the UE 202. The processor 206 may include specialized processing units such as integrated system (bus) controllers, memory management control units, floating point units, graphics processing units, digital signal processing units, etc. In embodiments, the processor 206 may include a central processing unit (CPU), a graphics processing unit (GPU), or both. The processor 206 may be one or more general processors, digital signal processors, application-specific integrated circuits, field-programmable gate arrays, servers, networks, digital circuits, analog circuits, combinations thereof, or other now-known or later developed devices for analyzing and processing data. The processor 206 may execute a software program, such as code generated manually (e.g., programmed) to perform the desired operation.

In embodiments, the memory 208 may include any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The memory 208 is communicatively coupled with the processor 206 to store bitstreams or processing instructions for completing a process. Further, the memory 208 may include an operating system for performing one or more tasks of the system 200, as performed by an operating system (e.g., a generic operating system) in the communications domain. The memory 208 may also store data blocks generated by the UE 202 for future processing.

In embodiments, the network entity 210 refers to any entity that performs one or more functionalities of a network connection between the UEs 202 (e.g., including a plurality of instances of the UE 202) and a plurality of base stations. Further, a network connection may be established between the UEs 202 and the plurality of base stations via a communication port or interface or using a bus (not shown). The communication port may be configured to connect with a network, external media, memory, or any other components in a system, or combinations thereof. The network connection may be a physical connection, such as a wired Ethernet connection, or may be established wirelessly. Likewise, the additional connections with other components of the system 200 may be physical or may be established wirelessly. The network may alternatively be directly connected to the bus.

The network connection between the user equipment 202 and the network entity 210 may support communication between multiple users by sharing available network resources. For example, in the wireless communication network, information may be transmitted in various multiple access schemes, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), OFDM-FDMA, OFDM-TDMA, and OFDM-CDMA.

According to embodiments, the network entity 210 may be implemented by a base station in communication with the UE 202. The base station may generally refer to a fixed station that communicates with user equipment and/or other base stations and may exchange data and control information by communicating with user equipment and/or other base stations. For example, the base station may also be referred to as a Node B, an evolved-Node B (cNB), a next generation Node B (gNB), a sector, a site, a base transceiver system (BTS), an access point (AP), a relay node, a remote radio head (RRH), a radio unit (RU), a small cell, or the like. In the present specification, a base station or a cell may be interpreted in a comprehensive sense to indicate some area or function covered by a base station controller (BSC) in CDMA, a Node-B in WCDMA, an eNB in LTE, a gNB or sector (site) in 5G, and the like, and may cover all the various coverage areas such as megacell, macrocell, microcell, picocell, femtocell and relay node, RRH, RU, and small cell communication range.

In embodiments, the UE 202 may also be referred to as a dual-SIM UE 202. The dual-SIM UE 202 includes the radio frequency transceiver circuit 204, which includes two receivers (R×1 and R×2), and a transmitter (Tx1). The dual-SIM UE 202 includes two SIM cards, e.g., SIM1 and SIM2. SIM1 corresponds to Rx1 and SIM2 corresponds to Rx2. Further, each of the receiving channels corresponding to the receivers (Rx1 and Rx2) may receive the DL signals from the network entity 210. However, the processor 206 may allocate either Rx1 or Rx2 to the Tx1 at a particular timestamp period for actively communicating with the network entity 210 based on the priority of the request made by each of the receiving channels. For example, the processor 206 may allocate Rx1 to Tx1 based on the high-priority request received by the Rx1, such as making a call via the SIM1.

Further, the processor 206 of the dual-SIM device 202 is configured to perform a set of operations to schedule the plurality of signals. The processor 206 is configured to determine the DL signals in the two Rx channels and the UL signals in the Tx channel. Subsequently, active communication through the Tx1 channel with the corresponding Rx1 channel is determined by the processor 206. Further, the processor 206 is configured to receive one or more DL signals in the Rx2 channel, wherein no Tx channel is allocated to the Rx2 channel for transmitting UL signals corresponding to received one or more DL signals (e.g., the dual-SIM device 202 has tuned away to the SIM1). In the absence of the Tx1 channel corresponding to the Rx2 channel (e.g., when the no Tx channel is allocated to the Rx2 channel), the transmission of the UL signals is skipped by the processor 206. However, the processor 206 is configured to generate a block based on a plurality of packets received corresponding to one or more pending UL grants and stored in the memory 208. More particularly, the processor 206 is configured to determine radio link control (RLC) service data unit (SDU) packets of the one or more pending UL grants corresponding to the one or more received DL signals in the Rx2 channel. Further, a UL Transport Block (UL-TB) is generated using the RLC SDU packets and stored in the memory 208 or any buffer. Once the Rx2 channel has received the allocation of the Tx1 channel (e.g., once the UE has tuned away to the SIM2) in a timeframe within the maximum (or upper limit) hybrid automatic repeat request (HARQ) re-transmission (RETX) window, the processor 206 is configured to transmit the stored UL-TB block via the Tx1 channel. Therefore, the network entity 210 receives all data packets corresponding to the DL signals sent by the network entity 210 to the UE 202.

In embodiments, the processor 206 may be configured to generate the data block by initially selecting the one or more UL grants corresponding to the one or more received DL signals in the Rx2 channel. The processor 206 is further configured to store the selected one or more UL grants in the memory 208 or any buffer instead of storing the UL TB block using the RLC SDU packets. The one or more UL grants occupy less memory than the UL TB. On the contrary, the RLC SDU packets occupy a larger memory block. Therefore, the one or more UL grants are stored instead of the RLC SDU packets. Further, as and when the Rx2 channel receives an allocation of the Tx1 channel in an active communication session, the processor 206 is configured to generate the UL TB block based on the RLC SDU corresponding to the stored one or more UL grants.

In embodiments, the HARQ RETX window may be associated with an adaptive retransmission or a non-adaptive retransmission. The HARQ is a type of error detection and correction technique used in a physical layer of a network model. The adaptive HARQ refers to a change of transmission parameters like code rate, number of resource allocations, and modulation order during retransmissions. The non-adaptive HARQ refers to an unchanged retransmission packet format that is known to both communicating parties, e.g., the UE 202 and the network entity 210.

In embodiments, the processor 206 is configured to dynamically readjust a timeframe window for scheduling transmission of the plurality of signals through the plurality of Tx channels from the first set of Rx channels or the second set of Rx channels. The dynamic readjustment of the timeframe window is determined based on a plurality of network parameters. The plurality of network parameters includes at least one of a desired quality of service (QoS), resource allocation (QoS met), packet loss, latency, and/or handover (HO). The QoS is a technique in the network to control traffic and ensure the performance of critical applications with limited network capacity. According to embodiments, the resource allocation may refer to resources allocated to meet the desired QoS. Further, the packet loss is the number of packets that fail to reach the destination. Furthermore, in the HO technique, the timeframe includes a time period to transfer from the current serving cell to another one while it is moving toward a neighbor cell. Therefore, the processor 206 is configured to allocate more timeframe window of the plurality of Tx channels to either the first set of Rx channels or the second set of Rx channels, which uses more time to meet the QoS and all other network parameters. In a non-limiting example, the user may request a voice call via SIM1 of a dual-SIM UE 202. Also, the user is continuing internet surfing via SIM2 of the dual-SIM UE. Now, based on the plurality of network parameters, the processor 206 may dynamically allocate the Tx channel to the SIM1 for a timeframe of 32 milliseconds (ms). On the contrary, the processor 206 may dynamically allocate the Tx channel to the SIM2 for a timeframe of 8 ms.

For example, the QoS desired for a voice call is higher than any other service request. Thus, if the user performs the voice call via stack 1 or SIM1, then the Rx1 channel uses a higher timeframe window allocation for the Tx channel than all other Rx channels in circumstances in which the block error rate (BLER) and/or packet loss is higher. Allocation of more timeframe windows of the Tx channel for Rx1 is performed for providing more resource allocation in order to meet the desired QoS for the voice call. In contrast, the Rx2 channel may use fewer timeframe window allocations for facilitating internet access. However, if the BLER and packet loss do not improve on the SIM1 despite allocating more timeframe window for the Tx channel then the processor 206 may be configured to increase slowly or gradually the timeframe window allocation for the Tx channel to the SIM2 such that the Internet access does not suffer as well. That is, if for example, although the Tx channel timeframe allocation is increased by 100% for SIM1, however, the BLER and the packet loss are still not improved or are marginally improved. Therefore, the processor 206 is further configured to shift the timeframe window allocation for the TX channel to the SIM2 for improving the quality of the Internet access. This results in an improvement of the Internet access quality on SIM2 without impacting the voice call quality on SIM1 as it was when 100% Tx channel timeframe window is allocated to SIM1.

The shift of the timeframe windows of the Tx channel from $Rx_1$ (SIM1) to $Rx_2$ (SIM2), which involves understanding of the dynamic timeframe window of the Tx channel in use. For instance, when the SIM1 is engaged in a voice call and the SIM2 is transmitting internet data, the initial channel quality for the SIM1 is very good. Voice packets are generated every 20 ms, and the SIM1 is able to transmit these voice packets without any HARQ retransmission, meaning that the UL grant is received, and the voice packets are transmitted without errors to the network entity 210. In other words, the UL grant is received, and the voice packets are transmitted error-free to the network entity 210, which acknowledges the UL PDU to the UE 202 over HARQ. Consequently, the Tx channel being used by the SIM1 is 10 ms. Considering a maximum HARQ retransmission of 5 and a HARQ round trip time (RTT) of 8 ms, the total HARQ retransmission window is 40 ms, leading to two views of the TX channel usage.

a) Firstly, voice packets are generated every 20 ms, so the SIM1 RX1 utilizes 10 ms of the timeframe window of the TX channel, leaving 10 ms for the RX2 SIM2 if it has some UL transmission pending.
b) Secondly, considering the HARQ retransmission window of 40 ms, out of which only 10 ms is being used by the RX1 SIM1, the remaining 30 ms may be used by the RX2 SIM2.

As the HARQ error rate increases over time to 25%, 50%, 75%, and near 100%, the Tx channel allocation to the SIM1 is gradually increased from 10 ms to 20 ms to 30 ms, and eventually to nearly 40 ms out of 40 ms. This adjustment is made to maintain call quality by allocating more TX channels and attempting HARQ retransmission of the PUSCH packet containing the voice packet until all max HARQ retransmission chances have been exhausted. This is done to maximize the probability of the PUSCH packet being successfully decoded at the network entity 210. Consequently, the allocation timeframe of the TX channel is heavily skewed towards the SIM1 RX1, with the SIM2 RX2 being allocated the remaining timeframe of 20 ms, 10 ms, or near Oms, respectively. It's important to note that the PUSCH packet generated for the voice packet at time T is retransmitted along with the PUSCH packet containing the second voice packet generated at time T+20. These two PUSCH packets are in transmission over two different HARQ identities, following the 3GPP standard where the HARQ buffer used for PUSCH for the voice packet is blocked until the maximum (in this case, 5) HARQ retransmission attempts.

Despite these efforts, if the HARQ error rate does not improve and remains near 75% or near 100%, it indicates that despite all HARQ retransmissions, the SIM1 is unable to improve the error rate. Therefore, it is monitored for a configurable time chosen by the UE 202, and then a decision is made to slowly reduce the Tx channel allocation to say 30 ms for the SIM1 and 10 ms for the SIM2 to ensure data performance on the SIM2 while attempting to strike a balance. This approach is further explained in the block diagram of FIG. 3.

Despite allocating almost the entirety of the 40 ms window to the SIM1, the HARQ error rate may not improve and remain near 75% or near 100%. This indicates that despite all HARQ retransmissions, the SIM1 is unable to improve the error rate. Consequently, after monitoring for a specified time (e.g., 1 second or a configurable time chosen by the UE 202), a decision is made to slowly reduce the Tx channel allocation to say 30 ms for the SIM1 and 10 ms for the SIM2 to ensure data performance on SIM2. This represents an attempt to strike a balance, as described in conjunction with FIG. 3.

Figure 3:
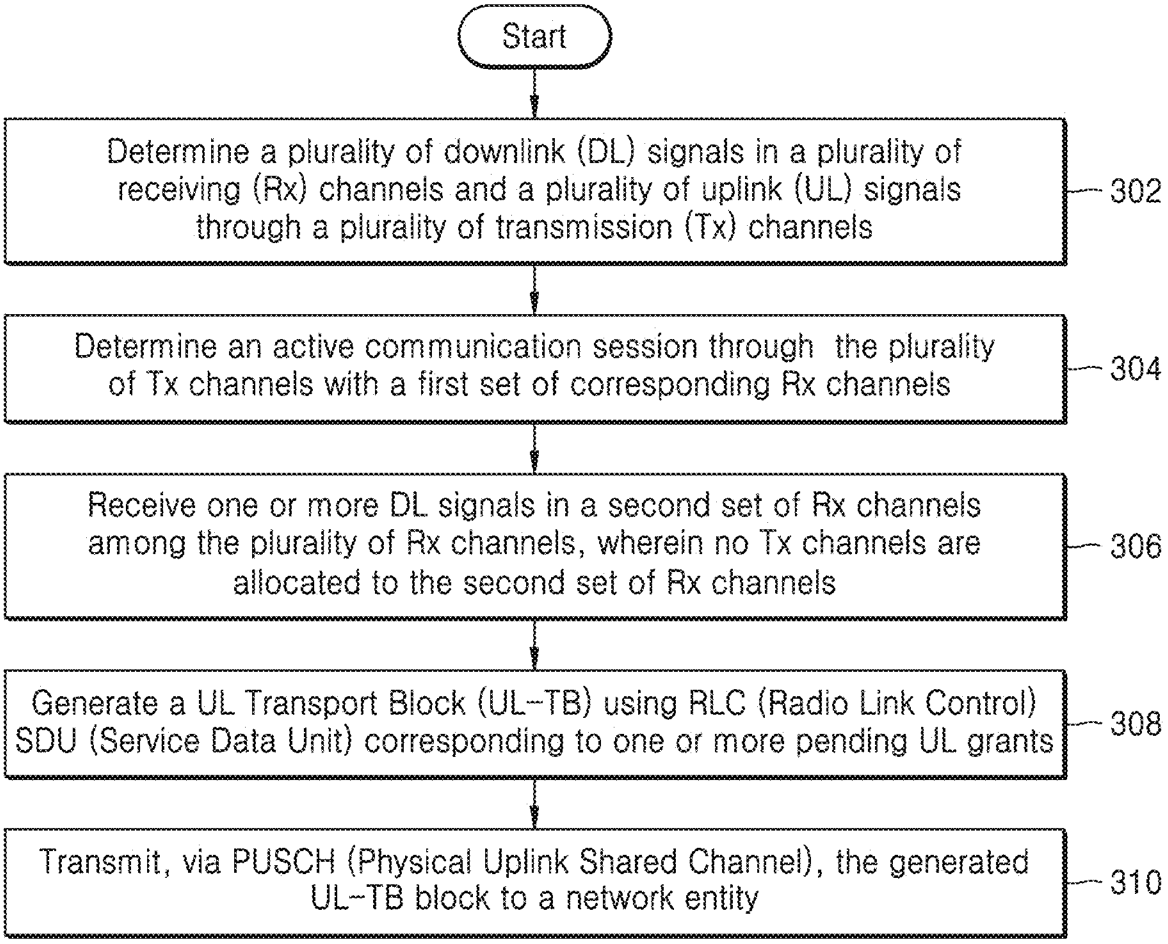
FIG. 3 illustrates a flow chart of a method for scheduling the transmission of a plurality of signals, in accordance with embodiments of the present disclosure.

FIG. 3 illustrates a flow chart of a method for scheduling the transmission of a plurality of signals, in accordance with embodiments of the present disclosure. FIG. 3 illustrates the method 300 for scheduling a transmission in a multi-SIM UE having a plurality of receiving (Rx) channels and a plurality of transmission (Tx) channels. While the discussion of FIGS. 3-5 may refer to a plurality of uplink (UL) signals in a plurality of Tx channels, embodiments are not limited thereto. According to embodiments, the UE 202 may include only one uplink (UL) signal in only one Tx channel as with the dual-SIM device 202 discussed herein. The method initializes its execution from the start block of FIG. 3.

The method 300 comprises determining (at operation 302) a plurality of downlink (DL) signals in the plurality of Rx channels of the UE 202 and a plurality of uplink (UL) signals in the plurality of Tx channels of the UE 202. The DL signals are received by the UE 202 from the network entity 210 via the Rx channels. Further, the UL signals are transmitted from the UE 202 to the network entity 210 via the Tx channels. The DL signals in the Rx channels and the UL signals in the Tx channels are determined by the processor 206. The flow of the method now proceeds to operation 304.

At operation 304, the method 300 further comprises determining an active communication session through the plurality of Tx channels with a first set of Rx channels among the plurality of Rx channels. According to embodiments, the active communication session may be performed by the UE 202. All of the plurality of Tx channels are coupled with the first set of Rx channels for performing the communication in the active session. The first set of Rx channels among the plurality of Rx channels are engaged as the number of Rx channels is greater than (e.g., always greater than) the number of Tx channels due to the higher cost of the transmitter. According to embodiments, the first set of Rx channels includes fewer than all of the plurality of Rx channels. Therefore, only the first set of Rx channels is able to perform active communication with (e.g., only SIMs associated with the first set of Rx channels is able to perform active communication via) all corresponding Tx channels. In a non-limiting example, a UE 202 may include five SIMs and two transmitters. Thus, the UE 202 includes five Rx channels and two Tx channels. Hence, only two Rx channels (e.g., the first set of Rx channels) may actively communicate with the corresponding two Tx channels in a timestamp period. The remaining three Rx channels await allocation of Tx channels after the completion of the active communication session. The flow of the method now proceeds to operation 306.

At operation 306, the method 300 further includes receiving one or more DL signals in a second set of Rx channels among the plurality of Rx channels. Each Rx of the first set of Rx channels is different from each Rx of the second set of Rx channels. The second set of Rx channels does not have any Tx channels for transmitting one or more UL signals corresponding to the one or more received DL signals (e.g., the UE 202 is tuned away from the SIMS corresponding to the second set of Rx channels). Once the one or more DL signals are received by the UE 202 via the second set of Rx channels, the one or more UL signals are formed in the UE 202 for transmission into the network entity 210. However, in the absence of any corresponding Tx channels, the UE 202 is unable to transmit the UL signals into the network. In a non-limiting example, and continuation of the example provided in operation 304, the two Rx channels (e.g., the second set of Rx channels) out of three Rx channels may receive the one or more DL signals from the network entity 210. However, in the absence of the Tx channels (which are allocated to the first set of Rx channels), the UL signals corresponding to the DL signals are not transmitted to the network entity 210 from the UE 202. In this example, each of the two Rx channels of the first set of Rx channels is different from each of the other two Rx channels of the second set of Rx channels. The flow of the method now proceeds to operation 308.

At operation 308, the method 300 further includes generating a UL transport block (UL-TB) using the radio link control (RLC) service data unit (SDU) corresponding to one or more UL grants of the one or more UL signals. Thus, instead of skipping both the transmission and the data packets, the transmission is skipped but the data blocks are generated from the data packets. More particularly, the UL-TB is generated from the RLC SDU packets and stored in a memory 208 or a hybrid automatic repeat request (HARQ) buffer. The flow of the method now proceeds to operation 310. According to embodiments, operations 306 and 308 may be performed while the second set of Rx channels does not have any Tx channels for transmitting one or more UL signals corresponding to the one or more received DL signals.

At operation 310, the method 300 further includes transmitting the generated UL-TB block to a network entity 210 via a physical uplink shared channel (PUSCH). The generated UL-TB block is transmitted to the network entity 210 when (e.g., in response to) an allocation of the Tx channels within the active communication session is received by the second set of Rx channels (e.g., the UE 202 tunes away to SIMs corresponding to the second set of Rx channels) and a PUSCH opportunity falls within the maximum (or upper limit) HARQ re-transmission (RETX) window. For example, in HARQ RETX, once the UE 202 fails to transmit any packets to the network entity 210, the UE 202 again tries at least four to five times for retransmission of the packets. Further, the retransmission of data packets is initiated after every HARQ round trip time (RTT), say 8 ms in long term evolution (LTE) frequency division duplex (FDD), for four to five times. Thus, if the second set of Rx channels receives the allocation of corresponding Tx channels within a maximum (e.g., upper limit) of (8*5)=40 ms, the generated UL-TB block is transmitted to the network entity 210. Thus, once the UL-TB is transmitted, the communication via the second set of Rx channels is also in active status and the network may acknowledge with respect to the received block.

The method operations 302 through 310, and other operations disclosed herein, are performed by the processor 206 of the UE 202.

Figure 4:
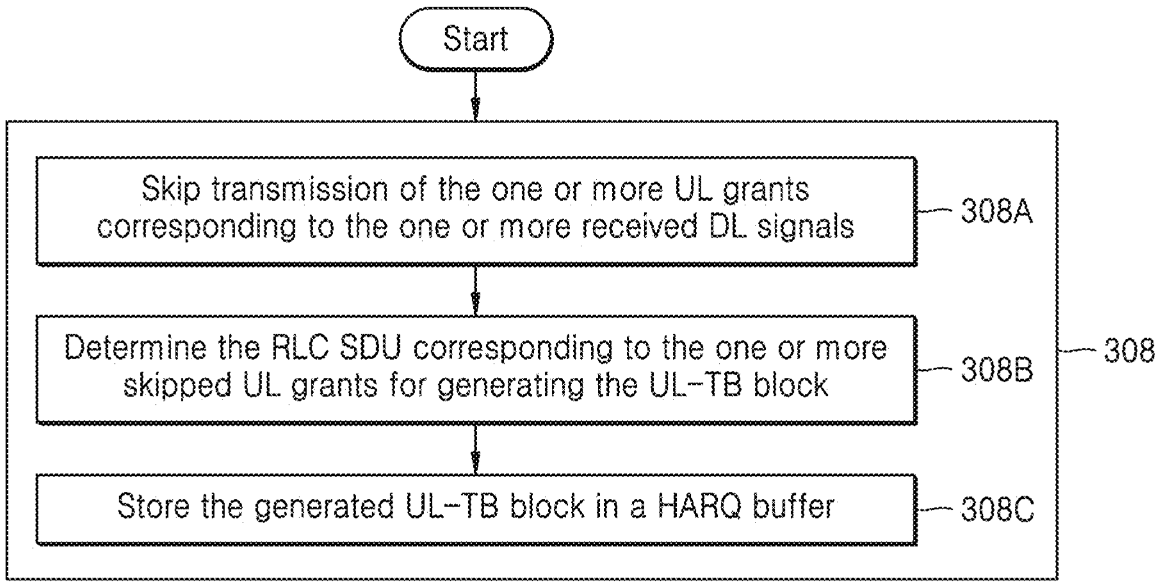
FIG. 4 illustrates a first flow chart of subsequent operations of method operation 308 of FIG. 3, in accordance with embodiments of the present disclosure.

FIG. 4 illustrates a first flow chart of method operation 308 of FIG. 3 in further detail, in accordance with embodiments of the present disclosure.

FIG. 4 discloses detailed operations for generating the UL TB using RLC SDU packets corresponding to one or more pending UL grants of the one or more UL signals.

The method, in operation 308A, includes skipping transmission of the one or more UL grants corresponding to the one or more received DL signals by the second set of Rx channels. The transmission of one or more UL grants is skipped by the processor 206 due to the unavailability of Tx channels corresponding to the second set of Rx channels. According to embodiments, the skipped transmission of the one or more UL grants may correspond to a skipped opportunity for transmitting the one or more UL grants (see discussion of FIGS. 6-7), and the skipped transmission is different from the transmission performed in operation 310 discussed in connection with FIG. 3. The flow of the method now proceeds to operation 308B.

The method, in operation 308B, includes determining the RLC SDU corresponding to the one or more skipped UL grants for generating the UL-TB block. Although transmission of the UL grants is skipped, however, the method includes generating the UL-TB block based on the RLC SDU corresponding to the one or more UL grants (e.g., during operation 308B). Therefore, the data block is generated corresponding to the skipped UL grants for transmission in the future at the time of allocation of the Tx channels for the second set of Rx channels. The flow of the method now proceeds to operation 308C.

The method, in operation 308C, includes storing the generated UL-TB block in the memory 208 or the HARQ buffer. In embodiments, the method may include storing the generated UL-TB block in a cache memory of the processor 206 in order to increase the speed of retrieving the block at the time of retransmission. Upon storing the UL-TB block, the method further includes transmitting the stored UL-TB block to the network entity 210 via the PUSCH (e.g., in operation 310 discussed in connection with FIG. 3) when the allocation of Tx channels is received by the second set of Rx channels.

Figure 5:
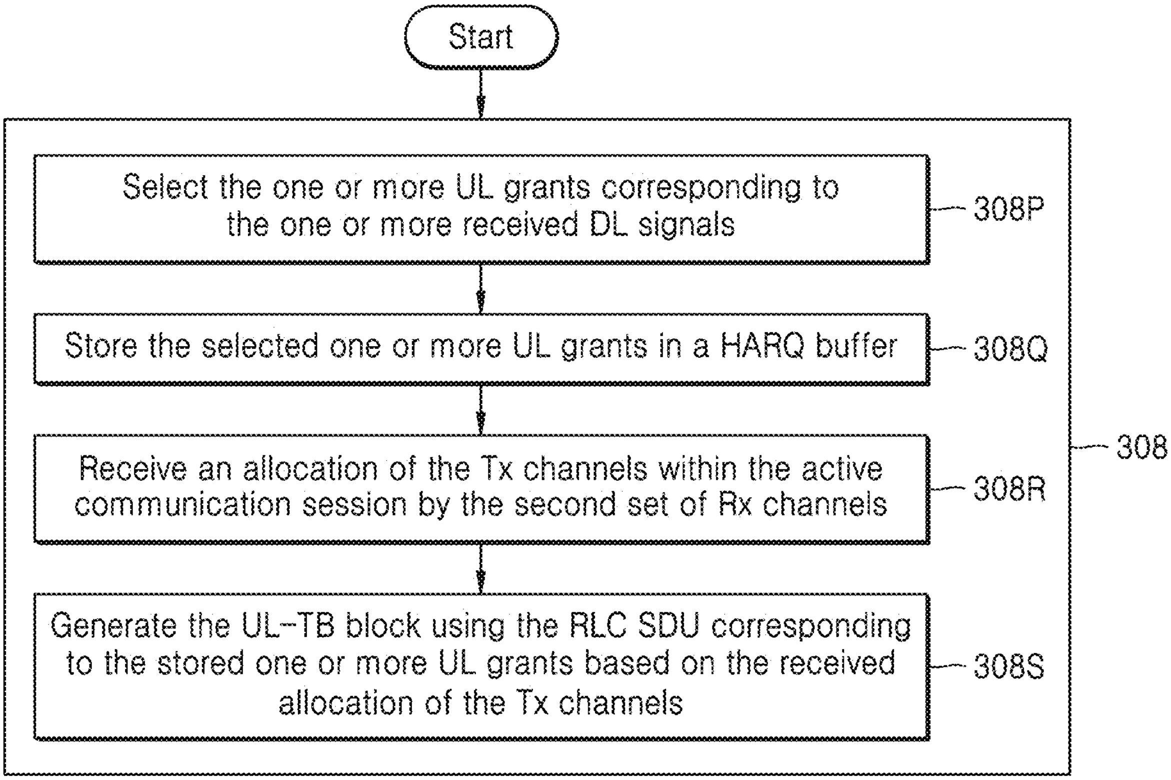
FIG. 5 illustrates a second flow chart of subsequent operations of method operation 308 of FIG. 3, in accordance with embodiments of the present disclosure.

FIG. 5 illustrates a second flow chart of method operation 308 of FIG. 3 in further detail, in accordance with embodiments of the present disclosure.

The method, in operation 308P, includes selecting the one or more UL grants corresponding to the one or more received DL signals via the second set of Rx channels from the network entity 210. The transmission of the one or more UL grants corresponding to the one or more DL signals is skipped due to the unavailability of the Tx channels (e.g., operation 308P may include operations similar to those of operation 308A of FIG. 4 with respect to skipping the transmission of the one or more UL grants). The flow of the method now proceeds to operation 308Q. The operation performed at 308P, as shown in FIG. 5, is described using one or more example scenarios, which are listed below.

In one example scenario, there are 2Rx and one 1Tx. The SIM1 and SIM2 are receiving DL data and, therefore, SIM1 and SIM2 have to periodically send HARQ ACK, RLC ACK, and possibly TCP ACK. Both SIM1 and SIM2 have the same priority of packets and may want to send on the uplink. For instance, SIM1 and SIM2 may want to transmit SRB packets or SIM1 and SIM2 want to transmit data packets of the same QCI. In this scenario, out of a 40 ms HARQ window (where 8 ms is RTT and 5 is the max HARQ retransmission value configured from the network), transmission time interval (TTI) 1 to 20 is allocated for SIM1, and TTI 21 to 40 is allocated for SIM2. This way, UL grants are utilized for both SIMs and important UL signals like SRS and CQI are also transmitted over the UL path, providing each with 2 HARQ retransmission opportunities. If the HARQ error is slightly higher on the SIM1 (TX path) and slightly lower on the SIM2, then this scheme could be skewed to ensure 3 HARQ opportunities to the SIM1 (i.e., around 25-25 ms, i.e., period TTI 1 to 25) while the SIM2 gets TTI 26 to 40 accordingly.

In the above-mentioned scenario, assuming no loss of generality, let's consider the TTI window from TTI 1 to 25 of the SIM1, where the SIM1 is utilizing the TX Channel. During this time window, a UL grant signal is received for both SIM1 and SIM2, specifically on TTI 1. Subsequently, the UL grant HARQ info for SIM2 is stored, and the UL grant HARQ buffer for the SIM1 is generated using a MAC transport block containing RLC PDUs, MAC control elements, or the aperiodic CQI and HARQ info. The information is then transmitted over the air to the network. At TTI 26, the SIM2 is allocated the TX channel, and the SIM2 evaluates if there remains a HARQ retransmission period for the grant received at TTI 1 for SIM2. It is determined that 2 HARQ retransmission opportunities are still available, and thus SIM2 forms the HARQ buffer using the MAC transport block containing the RLC PDUs or the required MAC control elements or aperiodic CQI, HARQ info, etc. As a result, the grant is utilized.

In another example scenario, there are NRx and MTx where N is more than 2 and M is more than 1. Let's consider N=4 and M=2, which means there are 4Rx and 2Tx. Now divide this into two pairs of 2Rx and 1Tx. The grants received are on all the 4Rx paths, then selectively work on each pair of 2Rx and 1Tx paths as explained in the first example of 2Rx and 1Tx. The pairing of the 2Rx path is maximized such that one high BLER is paired with one low BLER or an equal BLER-equal BLER case.

In another example scenario, there are 5Rx and 2Tx. The division of this into two pairs of 2Rx and 1Tx results in two such pairs of 2Rx and 1Tx and one standalone Rx. The grants received are on all the 5Rx paths, then selectively work on each pair of 2Rx and 1Tx paths as explained in the first scenario of 2Rx and 1Tx. The pairing of the 2Rx path is maximized such that one high BLER is paired with one low BLER or an equal BLER-equal BLER case. There still remains 1Rx whose UL grants could be ignored. In the scenario, the disclosed method may determine a pair of the Rx Channel where the HARQ BLER is minimum and allocate one HARQ transmission opportunity from each pair. This way, the disclosed method may continue to handle the UL grants and the UL signal transmission for all 5 Rx paths.

The method, in operation 308Q, includes storing the selected one or more UL grants in the memory 308 or the HARQ buffer. The one or more UL grants are stored without forming the data block (e.g., without forming the UL-TB block). Since the size of the one or more UL grants is much less than the data block, the one or more UL grants use less storage space. In a non-limiting example, the data block may occupy 1000 bytes of memory space. On the contrary, the UL grant may only occupy 20 bytes of memory space. In embodiments, the selected one or more UL grants may be stored in the cache memory of the processor 206 of the UE 202 to increase the speed of accessing the one or more UL grants. The flow of the method now proceeds to operation 308R.

The method, in operation 308R, includes receiving an allocation of the Tx channels for the second set of Rx channels within the active communication session (e.g., the UE 202 tunes away to the SIMs associated with the second set of Rx channels). The method proceeds to operation 308S if the allocation of the Tx channels for the second set of Rx channels is received within the maximum (or upper limit) HARQ RETX timeframe, which is considered as the active communication session. For example, in HARQ RETX, the UE 202 or the network entity 210 tries to retransmit the packets a maximum (or upper limit) of four to five times, wherein each retransmission is initiated after 8 ms. Therefore, the maximum (or upper limit) HARQ RETX timeframe is (8*5)=40 ms. Thus, the method includes considering the allocation of Tx channels for the second set of Rx channels within the maximum (or upper limit) HARQ RETX timeframe only. The flow of the method now proceeds to operation 308S.

The method, in operation 308S, includes generating the UL-TB block using the RLC SDU corresponding to the stored one or more UL grants. Once the allocation of Tx channels is received in the active communication session, the UL-TB block is generated using the RLC SDU corresponding to the stored UL grants. Upon generating the UL-TB block, the method includes transmitting the UL-TB block to the network entity 210 (e.g., in operation 310 discussed in connection with FIG. 3).

Figure 6:
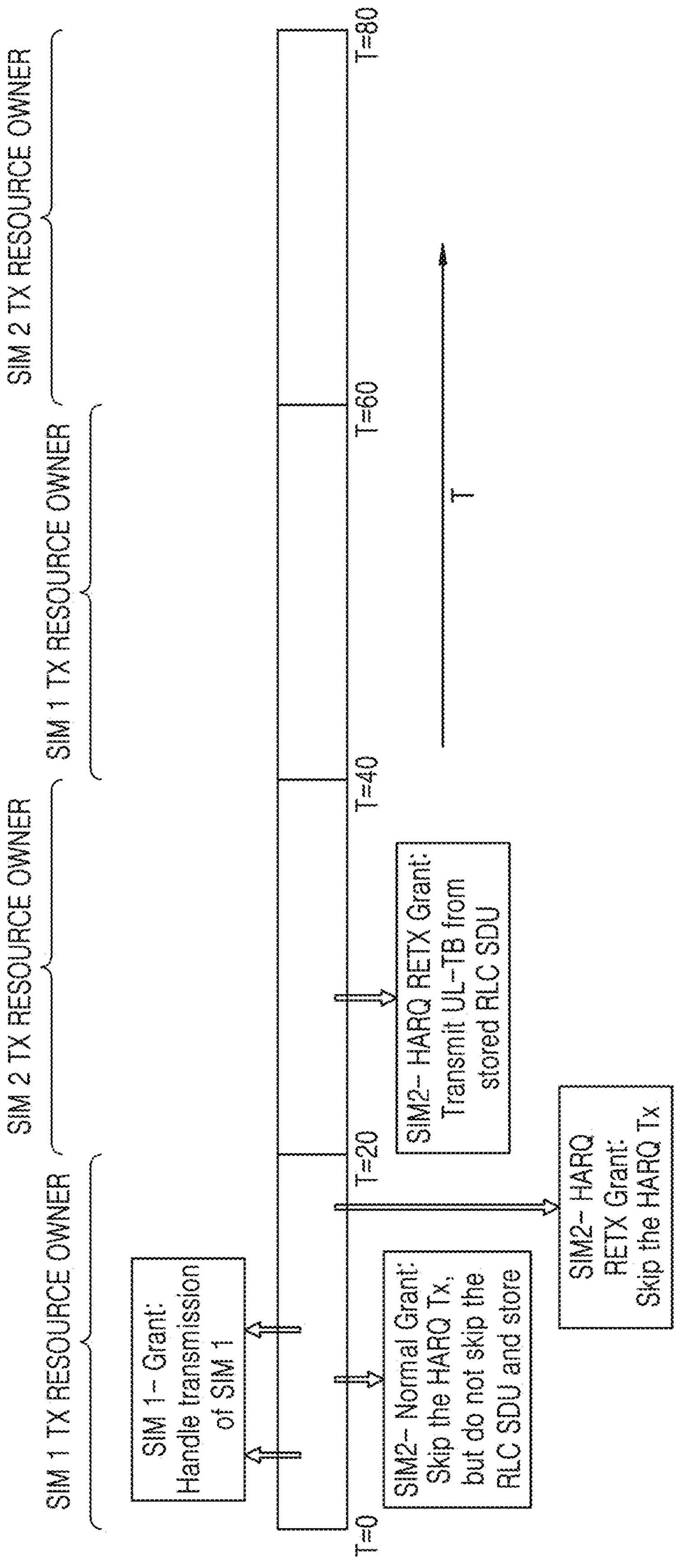
FIG. 6 illustrates an example use case of scheduling the transmission of a plurality of signals, in accordance with embodiments of the present disclosure.

FIG. 6 illustrates an example use case of scheduling the transmission of a plurality of signals, in accordance with embodiments of the present disclosure. In a non-limiting example, FIG. 6 illustrates the scheduling of transmission in a dual-SIM UE 202 in a timeframe, T, between T=0 ms to T=80 ms. The UE 202 includes two SIMs-SIM1 and SIM2. Further, the UE 202 includes two Rx channels and one Tx channel for communication with the network entity 210. From timeframe T=0 ms to T=20 ms, the Tx channel is allocated to the Rx channel of SIM1. Further, from timeframe T=21 ms to T=40 ms, the Tx channel is allocated to the Rx channel of SIM2.

From timeframe T=0 ms to T=20 ms, the SIM1 receives the DL signals via the Rx channel, and the corresponding UL signals are transmitted to the network entity 210 as the Tx channel is allocated to the Rx channel of SIM1. However, during the normal grant of SIM2 between the timeframe T=0 ms to T=20 ms, the UL signals are not transmitted to the network entity 210 in the absence of allocation of the Tx channel corresponding to the SIM2. Therefore, the HARQ transmission is skipped for UL signals of SIM2. However, the generation of the RLC SDU packets is not skipped. Further, the RLC SDU packets are stored in the memory 208 for generating the UL TB block. Subsequently, during the HARQ RETX for SIM2 within the timeframe of T=0 ms to T=20 ms, the HARQ retransmission is skipped again as the Tx channel is not allocated to the Rx channel of SIM2. According to embodiments, this HARQ retransmission corresponds to a second attempt at obtaining the previously skipped HARQ transmission. Thereafter, the Tx channel is allocated to the Rx channel of SIM2 between the timeframe of T=21 ms to T=40 ms. At this timeframe, during the HARQ RETX of SIM2 (e.g., a third attempt), the UL TB block corresponding to the stored RLC SDU packets is transmitted to the network entity 210. Therefore, the communication packets pertaining to SIM2 have now been transmitted to the network entity 210.

Figure 7:
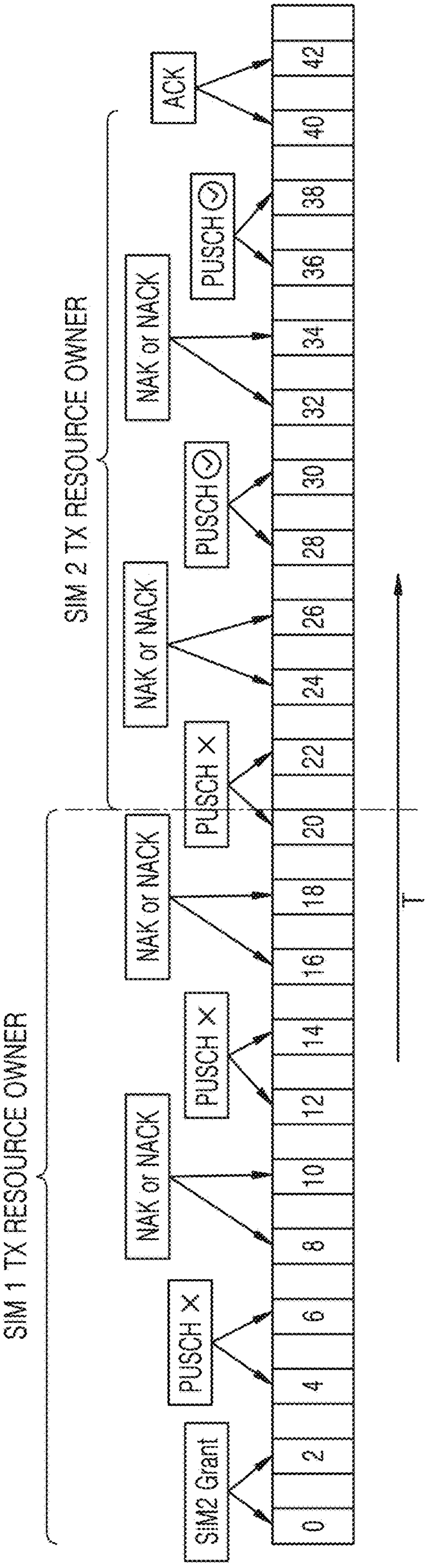
FIG. 7 illustrates an example use case of scheduling the transmission of a plurality of signals in each timestamp, in accordance with embodiments of the present disclosure.

FIG. 7 illustrates an example use case of scheduling the transmission of a plurality of signals in each timestamp, in accordance with embodiments of the present disclosure. In a non-limiting example, FIG. 7 illustrates the scheduling of transmission in a dual-SIM UE 202 in each of the timestamps, T, from T=0 ms to T=42 ms. In the dual SIM UE 202, the Tx channel is allocated to the SIM1's Rx channel from T=0 ms to T=20 ms. Further, the Tx channel is allocated to the SIM2's Rx channel from T=21 ms to T=40 ms. The example shown in FIG. 7 is for two grants received in SIM2 at T=0 ms and T=2 ms. The network transmits signals in each 4 ms. Therefore, SIM2 would use the PUSCH channel at timestamp T=4 ms (e.g., 0+4) and T=6 ms (e.g., 2+4) for transmitting the UL packets to the network. However, SIM2 does not have the corresponding Tx channel. Thus, the PUSCH channel is unavailable for SIM2 packet transmission at T=4 ms and T=6 ms. Therefore, the SIM2 receives a negative-acknowledgment or not-acknowledged (NAK or NACK) at T=8 ms and T=10 ms from the network entity 210. Similarly, SIM2 may not be allocated the PUSCH channel in T=12 ms and T=14 ms as the Tx channel is allocated to SIM1 from T=0 ms to T=20 ms. Also, SIM2 may not be allocated the PUSCH channel at T=22 ms, as the processor 206 may take some time to switch the Tx channel from the SIM1 Rx channel to the SIM 2 Rx channel. However, the SIM2 receives the PUSCH channel at T=28 ms and T=30 ms during the allocation of the Tx channel to the SIM2. Although the SIM transmits the packets at T=28 ms and T=30 ms, however, the network may not receive the UL packet. Thus, the SIM2 receives NAK or NACK at T=32 ms and T=34 ms. Finally, the SIM2 transmits the packets at T=36 ms and T=38 ms and receives an acknowledgment (ACK) at T=40 ms and T=42 ms from the network entity 210 based on the packet received by the network.

Referring now to the technical abilities and effectiveness of the method and system disclosed herein. The following technical advantages over the conventional and existing state of the art are provided such as playing an important role in scheduling a plurality of signals by arbitrating the plurality of Tx channels for the plurality of Rx channels. Thus, the present disclosure improves the quality of communication via the plurality of SIMs parallelly. Therefore, the user may continue over a voice call via one SIM, and the user is also capable to surf the internet on the other SIM at the same time (or contemporaneously) without discontinuing either of the services incurred. Thus, the present disclosure improves the voice quality in one SIM and enhances (e.g., reduces) data latency on the other SIM. In addition, the present disclosure utilizes the maximum (or upper limit) HARQ retransmission window as a factor (e.g., a primary factor) for TX resource time-sharing. Within the maximum (or upper limit) HARQ retransmission, the present disclosure determines a set of dynamic (or secondary) factors to readjust the timestamp period to assign the Tx channels to the Rx channels for prioritizing the voice call over surfing the internet. Those dynamic factors include packet loss, QoS (quality of service) demand (by user service) and supply (resource allocation from the network) ratio, uplink buffer capacity, voice traffic pattern, etc.

Figure 8:
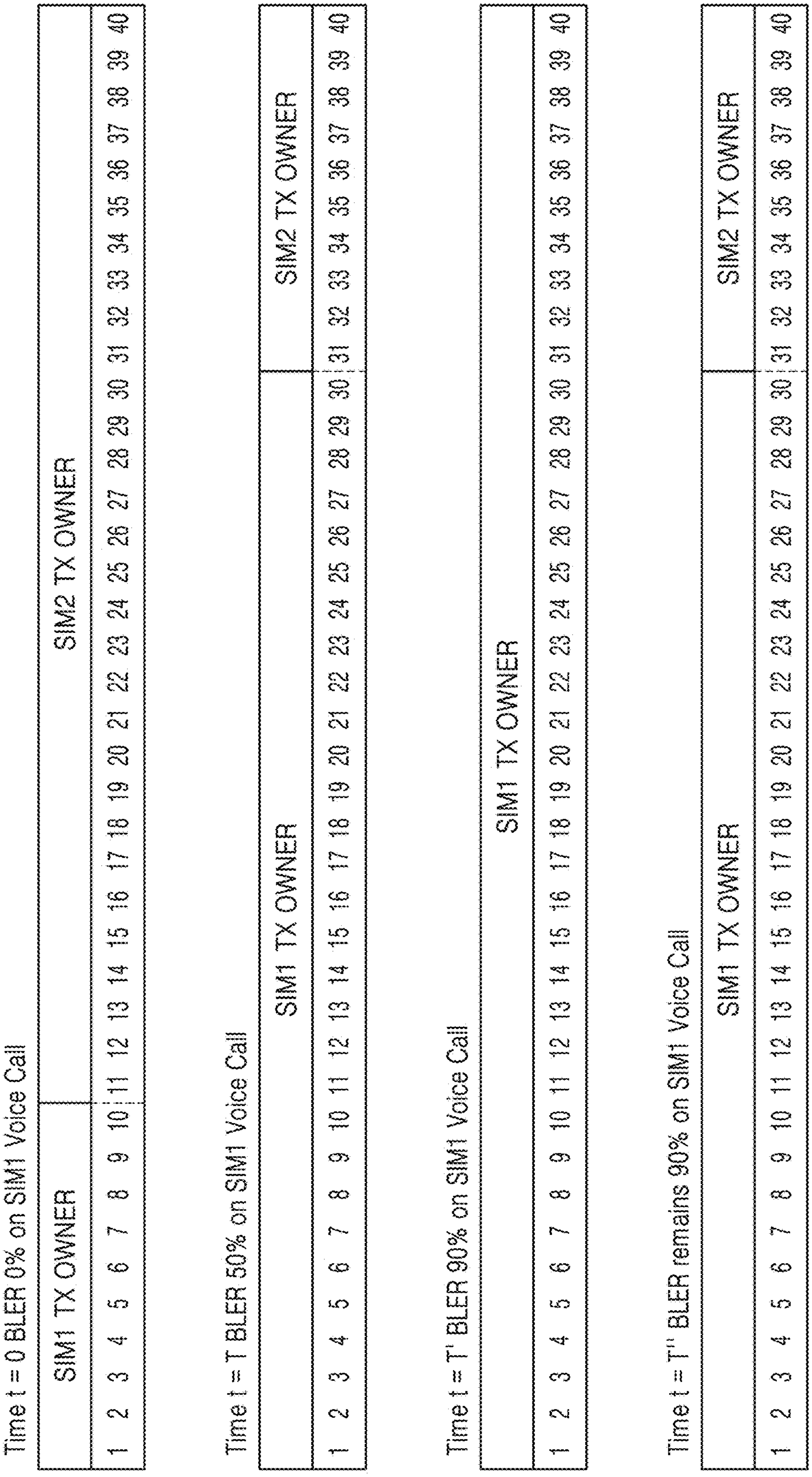
FIG. 8 illustrates an example use case of Tx channel window timeframe shifting, in accordance with embodiments of the present disclosure.

FIG. 8 illustrates an example use case of Tx channel window timeframe shifting, in accordance with embodiments of the present disclosure. In the provided example, the UE 202 dynamically adjusts the timeframe window for scheduling the transmission of multiple signals based on the plurality of network parameters. Let's consider a specific scenario at time t=0 with a Block Error Rate (BLER) of 0% on the SIM1 voice call. In this scenario, transmission time intervals (TTI) 1 to 10 are allocated for the SIM1, and TTI 11 to 40 are allocated for SIM2. As time progresses to t=T with a BLER of 50% on the SIM1 voice call, the allocation changes to TTI 1 to 30 for the SIM1 and TTI 31 to 40 for the SIM2. Subsequently, at time t=T' with a BLER of 90% on the SIM1 voice call, the allocation shifts to TTI 1 to 40 for the SIM1. Finally, at time t=T" with a BLER of 90% on the SIM1 voice call, the allocation changes to TTI 1 to 30 for the SIM1 and TTI 31 to 40 for the SIM2.

In conventional devices having fewer transmission channels than reception channels, and in methods performed thereby, SIMs corresponding to reception channels are unable to transmit signals (e.g., time-sensitive signals) while the transmission channels are not allocated to these SIMs. In some examples, such signals may include acknowledgements of received signals, periodic synchronization signals, etc. In the conventional devices and methods, the signals are discarded in response to determining that no transmission channel has been allocated for their transmission. This approach by the conventional devices and methods results in excessive resource wastage (e.g., bandwidth, processor, memory, power, etc., expended to transmit signals to the conventional devices that will go unacknowledged) and/or insufficient communication quality (e.g., reduced signal quality, increased data latency, etc.) due to the missed signals.

However, according to embodiments, improved devices having fewer transmission channels than reception channels, and methods performed thereby, are provided. In the improved devices and methods, the signals are stored in response to determining that no transmission channel has been allocated for their transmission. The stored signals may then be transmitted in response to allocation of a transmission channel, thereby enabling transmissions of signals that would be discarded by the conventional devices and methods. Accordingly, the improved devices and methods overcome the deficiencies of the conventional devices and methods to at least reduce resource wastage and/or improve communication quality.

According to embodiments, operations described herein as being performed by the system 200, the UE 202, any of the plurality of subscriber identity modules (SIM1, SIM2, . . . , SIM N), the radio frequency transceiver circuit 204, the processor 206, any of the plurality of transmitters (Rx1, Rx2, . . . , RxN), any of the plurality of receivers (Tx1, Tx2, . . . , TxM), and/or the network entity 210 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

As used herein the term "and/or" includes any and all combinations of one or more of the associated listed items. Although terms of "first" or "second" may be used to explain various components, the components are not limited to the terms. These terms should be used only to distinguish one component from another component. For example, a "first" component may be referred to as a "second" component, or similarly, and the "second" component may be referred to as the "first" component. Expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail herein. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, contemporaneously, or in some cases be performed in reverse order.

While specific language has been used to describe the disclosure, any limitations arising on account of the same are not intended. As would be apparent to a person in the art, various working modifications may be made to the method in order to implement the inventive concepts as taught herein.

The drawings and the forgoing description give examples of embodiments. Those skilled in the art will appreciate that one or more of the described elements may well be combined into a single functional element. Alternatively, certain elements may be split into multiple functional elements. Elements from one example may be added to another example. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to challenges have been described above with regard to specific examples. However, the benefits, advantages, solutions to challenges and any component(s) that may cause any benefit, advantage, or solution to occur or become more pronounced are not to be construed as a critical, required, or essential feature or component of any or all the claims.

We claim:

1. A method of scheduling transmission of a plurality of signals in a multi-subscriber identity module (SIM) user equipment (UE), the method comprising:

performing an active communication session through at least one transmission ($T_x$) channel of the multi-SIM UE, the at least one $T_x$ channel being associated with a corresponding first set of $R_x$ channels, the first set of $R_x$ channels including at least one among a plurality of receiving ($R_x$) channels of the multi-SIM UE;

receiving one or more downlink (DL) signals in a second set of $R_x$ channels among the plurality of $R_x$ channels while the at least one $T_x$ channel is not allocated to transmit one or more uplink (UL) signals corresponding to the one or more DL signals;

generating a UL Transport Block (UL-TB) using a Radio Link Control (RLC) Service Data Unit (SDU) in response to the receiving, the RLC SDU corresponding to one or more pending UL grants of the one or more UL signals; and transmitting the UL-TB to a network entity via a Physical Uplink Shared Channel (PUSCH).

2. The method as claimed in claim 1, wherein the transmitting transmits the UL-TB in response to:

an allocation of the at least one $T_x$ channel within the active communication session being received by the second set of $R_x$ channels; and a PUSCH opportunity falling within a Hybrid Automatic Repeat Request (HARQ) re-transmission (RETX) window.

3. The method as claimed in claim 1, wherein the generating comprises:

skipping a first transmission of the one or more pending UL grants corresponding to the one or more DL signals;

generating the UL-TB including determining the RLC SDU corresponding to the one or more pending UL grants; and storing the UL-TB in a HARQ buffer, wherein the transmitting is a second transmission performed after the storing.

4. The method as claimed in claim 1, wherein the generating comprises:

storing the one or more pending UL grants corresponding to the one or more DL signals in a HARQ buffer;

receiving, by the second set of $R_x$ channels, an allocation of the at least one $T_x$ channel within the active communication session; and generating the UL-TB based on the received allocation of the at least one $T_x$ channel, the RLC SDU corresponding to the stored one or more pending UL grants.

5. The method as claimed in claim 1, wherein a total number of the plurality of $R_x$ channels of the multi-SIM UE is greater than a total number of the at least one $T_x$ channel of the multi-SIM UE.

6. The method as claimed in claim 1, wherein each $R_x$ channel of the first set of $R_x$ channels is different from each $R_x$ channel of the second set of $R_x$ channels.

7. The method as claimed in claim 2, wherein the HARQ RETX window is associated with an adaptive retransmission.

8. The method as claimed in claim 2, wherein the HARQ RETX window is associated with a non-adaptive retransmission.

9. The method as claimed in claim 1, further comprising: dynamically readjusting a timeframe window for scheduling the transmission of the plurality of signals via the first set of $R_x$ channels or the second set of $R_x$ channels, the dynamically readjusting being based on at least one of a quality of service (QoS), a resource allocation, a packet loss, a latency, or a handover (HO).

10. The method as claimed in claim 1, wherein the receiving and the generating are performed during a first time period, none of the at least one Tx channel being allocated to transmit the one or more UL signals during the first time period; and the transmitting is performed during a second time period after the first time period, the at least one Tx channel being allocated to transmit the one or more UL signals during the second time period.

11. A system for scheduling transmission of a plurality of signals in a multi-subscriber identity module (SIM) user equipment (UE), comprises:

a plurality of receivers configured to receive a plurality of downlink (DL) signals via a plurality of receiving (Rx) channels;

at least one transmitter configured to transmit at least one uplink (UL) signals via at least one transmission (Tx) channel; and processing circuitry configured to:

perform an active communication session through the at least one $T_x$ channel with a corresponding first set of $R_x$ channels, the first set of $R_x$ channels including at least one among the plurality of $R_x$ channels, receive one or more DL signals in a second set of $R_x$ channels among the plurality of $R_x$ channels while the at least one $T_x$ channel is not allocated for transmitting one or more UL signals corresponding to the one or more DL signals, generate a UL transport block (UL-TB) using a radio link control (RLC) service data unit (SDU) in response to the reception of the one or more DL signals, the RLC SDU corresponding to one or more pending UL grants of the one or more UL signals, and transmit the UL-TB to a network entity via a physical uplink shared channel (PUSCH).

12. The system as claimed in claim 11, wherein the processing circuitry is configured to transmit the UL-TB to the network entity in response to:

an allocation of the at least one $T_x$ channel within the active communication session being received by the second set of $R_x$ channels, and a PUSCH opportunity falling within a Hybrid Automatic Repeat Request (HARQ) re-transmission (RETX) window.

13. The system as claimed in claim 11, wherein the processing circuitry is configured to generate the UL-TB including:

skipping a first transmission of the one or more pending UL grants corresponding to the one or more DL signals;

generating the UL-TB including determining the RLC SDU corresponding to the one or more pending UL grants; and storing the UL-TB in a HARQ buffer, wherein the transmission of the UL-TB to the network entity is a second transmission performed after the storing.

14. The system as claimed in claim 11, wherein the processing circuitry is configured to generate the UL-TB including:

storing the one or more pending UL grants corresponding to the one or more DL signals in a HARQ buffer;

receive, by the second set of $R_x$ channels, an allocation of the at least one $T_x$ channel within the active communication session; and generate the UL-TB based on the received allocation of the at least one $T_x$ channel, the RLC SDU corresponding to the stored one or more pending UL grants.

15. The system as claimed in claim 11, wherein a total number of the plurality of receivers of the multi-SIM UE is greater than a total number of the at least one transmitter of the multi-SIM UE.

16. The system as claimed in claim 11, wherein each $R_x$ channel of the first set of $R_x$ channels is different from each $R_x$ channel of the second set of $R_x$ channels.

17. The system as claimed in claim 12, wherein the HARQ RETX window is associated with an adaptive retransmission.

18. The system as claimed in claim 11, wherein the processing circuitry is configured to dynamically readjust a timeframe window for scheduling the transmission of the plurality of signals via the first set of $R_x$ channels or the second set of $R_x$ channels, the dynamic readjustment being based on at least one of a quality of service (QoS), a resource allocation, a packet loss, a latency, or a handover (HO).

19. The system as claimed in claim 11, wherein the processing circuitry is configured to:

receive the one or more DL signals and generate the UL-TB during a first time period, the at least one Tx channel not being allocated to transmit the one or more UL signals during the first time period; and transmit the UL-TB during a second time period after the first time period, the at least one Tx channel being allocated to transmit the one or more UL signals during the second time period.

20. A method of scheduling transmission of a plurality of signals in a multi-subscriber identity module (SIM) user equipment (UE), the method comprising:

determining an active communication session through a first transmission (Tx) channel among a plurality of Tx channels with a first receiving (Rx) channel among a plurality of Rx channels, receiving one or more downlink (DL) signals in a second Rx channel among the plurality of Rx channels while the plurality of Tx channels are not allocated to transmit one or more uplink (UL) signals corresponding to the one or more DL signals;

generating a UL Transport Block (UL-TB) using a Radio Link Control (RLC) Service Data Unit (SDU) in response to the receiving, the RLC SDU corresponding to one or more pending UL grants of the one or more UL signals; and transmitting the UL-TB to a network entity via a Physical Uplink Shared Channel (PUSCH), wherein the receiving and the generating are performed while none of the plurality of Tx channel is allocated to transmit the one or more UL signals.

* * * * *